US00RE34272E

United States Patent [19]

Michaud et al.

[11] E Patent Number: Re. 34,272

[45] Reissued Date of Patent: Jun. 8, 1993

[54] METHOD AND COMPOSITION FOR REFINEMENT OF METAL SURFACES

[75] Inventors: Mark D. Michaud, Bristol; Robert G. Zobbi, Southbury, both of Conn.

[73] Assignee: Rem Chemicals, Inc., Southington, Conn.

[21] Appl. No.: 785,075

[22] Filed: Oct. 30, 1991

Related U.S. Patent Documents

Reissue of:

[64] Patent No.: 4,906,327
Issued: Mar. 6, 1990
Appl. No.: 347,350
Filed: May 4, 1989

[51] Int. Cl.[5] ..... B44C 1/22; C23F 1/00; C03C 15/00; C03C 25/06

[52] U.S. Cl. ..... 156/637; 156/664; 252/79.3; 252/79.4; 148/240; 148/243

[58] Field of Search ..... 156/637, 638, 639, 656, 156/664, 903; 134/3, 32–34, 41; 148/240, 243; 252/79.1, 79.2, 79.3, 79.4, 79.5

[56] References Cited

U.S. PATENT DOCUMENTS

| | | | |
|---|---|---|---|
| 2,577,887 | 12/1951 | Gibson | 148/6.14 |
| 2,617,749 | 11/1952 | Gibson | 148/6.24 |
| 2,649,361 | 8/1953 | Springer et al. | 41/42 |
| 2,800,421 | 7/1957 | Goodspeed et al. | 148/6.14 |
| 2,832,707 | 4/1958 | Rossteutscher | 148/6.15 |
| 3,071,456 | 1/1963 | Cheesman | 51/316 |
| 3,097,117 | 7/1963 | Grunwald | 148/6.14 |
| 3,459,604 | 8/1969 | Freeman et al. | 148/6.24 |
| 3,547,711 | 12/1970 | Ashdown | 148/6.15 |
| 3,979,858 | 9/1976 | Semones et al. | 51/316 |
| 4,224,421 | 9/1980 | Streit et al. | 525/403 |
| 4,491,500 | 1/1985 | Michaud et al. | 156/628 |
| 4,705,594 | 11/1987 | Zobbi et al. | 156/637 |
| 4,724,041 | 2/1988 | Sherman | 156/637 |
| 4,724,042 | 2/1988 | Sherman | 156/637 |
| 4,818,333 | 4/1989 | Michaud | 156/628 |

FOREIGN PATENT DOCUMENTS

| | | |
|---|---|---|
| 2824975 | 12/1979 | Fed. Rep. of Germany . |
| 1120983 | 4/1956 | France . |

OTHER PUBLICATIONS

Article—"Vibratory Finishing With Chemical Accelerators" in the Jan. 1972 issue of Plating Magazine—pp. 38–40.

*Primary Examiner*—William A. Powell
*Attorney, Agent, or Firm*—Ira S. Dorman

[57] ABSTRACT

A composition for use in the vibratory mass finishing of magnetic stainless steel objects contains oxalic acid, sodium m-nitrobenzene sulfonate, and sodium thiocyanate, the latter two compounds being present in specified rations to one another. The preferred compositions include a hydroxyalkyl amine; for certain applications, they most desirably also include a poly(oxyethylene)-alkyl alcohol surfactant.

28 Claims, No Drawings

METHOD AND COMPOSITION FOR REFINEMENT OF METAL SURFACES

Matter enclosed in heavy brackets [ ] appears in the original patent but forms no part of this reissue specification; matter printed in italics indicates the additions made by reissue.

BACKGROUND OF THE INVENTION

A physicochemical process for refining metal surfaces is described and claimed in Michaud et al U.S. Pat. No. 4,491,500, issued Jan. 1, 1985, which process involves the development, physical removal and continuous repair of a relatively soft coating on the surface. The mechanical action required is preferably generated in a vibratory mass finishing apparatus, and very smooth and level surfaces are ultimately produced in relatively brief periods of time.

Zobbi et al U.S. Pat. No. 4,705,594, issued Nov. 10, 1987, provides a composition for use in the physicochemical mass finishing of metal surfaces of objects. The composition includes oxalic acid, sodium nitrate, and hydrogen peroxide, so formulated as to rapidly produce highly refined surfaces.

Michaud U.S. Pat. No. 4,818,333, issued Apr. 4, 1989, provides a physicochemical process for refining relatively rough metal surfaces to a condition of high smoothness and brightness, which is characterized by the use of a non-abrasive, high-density burnishing media.

Although the processes and chemical compositions of the foregoing inventions are most effective and satisfactory for their intended purposes, they are subject to certain limitations. In particular, the compositions disclosed therein are not effective, or at least not sufficiently so as a practical matter, for the refinement of magnetic stainless steel surfaces.

The prior art discloses a wide variety of compositions for treating metal surfaces for various purposes, in some instances having particular applicability to surfaces of stainless steel. For example, Gibson U.S. Pat. No. 2,577,887, issued Dec. 11, 1951, provides coatings for the protection of stainless steel during mechanical working operations. The composition comprises oxalic acid or ferric oxalate, an accelerator (preferably the ferric ion), and a member of the group of anions consisting of chloride, bromide, ferricyanide and thiocyanate; at least about two percent chloride ion, or equivalent anion, in the solution is deemed effective.

In U.S. Pat. No. 2,617,749, issued Nov. 11, 1952, Gibson provides a bath containing oxalic acid, thiocyanate, peroxide and ferric ion, also for producing protective coatings on stainless steel. It appears that thiocyanate constitutes at least about 25 weight percent of the active ingredients used, and the threshold quantity of that constituent, which is 1.5 percent of the solution, is deemed by the patentee to be "extremely critical."

Springer et al U.S. Pat. No. 2,649,361, issued Aug. 18, 1953, discloses a process for dissolving metals using an aqueous solution of one or more cyanides and one or more nitro-substituted aromatic compounds; ammonium and alkali metal cyanides, and m-nitrobenzene sulfonic acid, are specifically mentioned.

Goodspeed et al U.S. Pat. No. 2,800,421, issued July 23, 1957, provides a composition and method for coating stainless steel utilizing oxalic acid, halide and/or thiocyanate ion, and an organic nitro-compound; at least one percent of the halide ion or thiocyanate ion, based upon the total solution, is employed.

An aqueous solution for producing a black immersion coating on nickel is provided by Grunwald U.S. Pat. No. 3,097,117, issued July 9, 1963; in addition to a strong inorganic acid, the solution contains 0.05 to 1.0 mole per liter of an aromatic nitro derivative and 0.01 to 0.5 mole per liter of an inorganic thiocyanate.

In accordance with Freeman et al U.S. Pat. No. 3,459,604, issued Aug. 5, 1969, compositions useful in forming lubricant-carrying coatings on stainless steel may include, in addition to a major amount of oxalic acid, one or more accelerator compounds such as up to about 20 grams (and preferably one to ten grams) per liter of m-nitrobenzene sulfonic acid, and one to ten grams per liter of alkali metal and ammonium thiocyanates.

Ashdown U.S. Pat. No. 3,547,711, issued Dec. 15, 1970, provides a process for coating steel surfaces. In Example One, an oxalate coating is produced using a solution containing (on a per liter basis) 40 grams of oxalic acid, 1.5 grams of sodium metal dinitrobenzene sulfonate (expressed as $NO_2$), 2.6 grams of ammonium thiocyanate (expressed as SCN) and 5.0 grams of ammonium bifluoride (expressed as F).

In U.S. Pat. Nos. 4,724,041 and 4,724,042, both issued on Feb. 19, 1988, Sherman teaches compositions and methods for preparing ferrous metal components for electroplating, the method being carried out by agitating the components in a vibratory finishing vessel while they are immersed in a solution containing oxalic acid, a phosphorous sequestering agent, an ammonifying agent (for pH adjustment), a surfactant, and a carrier agent; in accordance with No. 4,724,042, monoethanolamine, carried by an absorbent such as diatomaceous earth, may be used for pH control.

Despite such teachings of the prior art, a demand remains for compositions, aqueous solutions, and methods that are effective for use in the physicochemical refinement of magnetic stainless steel surfaces.

Accordingly, the broad objects of the present invention are to provide novel compositions and novel aqueous solutions made from them, which solutions are effective for the refinement of metallic objects, and particularly those having magnetic stainless steel surfaces, by the mass finishing thereof; and to provide novel mass finishing processes utilizing such solutions.

Related objects of the invention are to provide such compositions, solutions and processes, by which surface refinement is achieved at high rates of speed, with highly uniform metal removal under suitable conditions, and without significant pitting, etching, corrosion or other intergranular attack of the workpiece surfaces.

More specific objects are to provide such compositions, solutions and processes with and by which surface refinement is achieved without significant pitting, etching, corrosion or other intergranular attack of workpiece surfaces, including those surfaces that are present at oxygen-starved sites; to provide such compositions, solutions and processes by and from which no objectional level of odor is generated; and to provide such compositions, solutions and processes which are used and carried out with particular effectiveness in open, vibratory mass finishing equipment.

SUMMARY OF THE INVENTION

It has now been found that certain of the foregoing and related objects of the invention are attained by the provision of a composition comprising, in a major amount, an acid ingredient consisting at least predominantly of oxalic acid and, in an amount of from one to 24 weight percent of the composition, an accelerating ingredient. The latter consists essentially of a thiocyanate salt and a m-nitrobenzenesulfonate salt, present in a molar ratio of 0.28 to 2.8:1.0, respectively. The solubility of the constituents of the composition is such that when the composition is added to water at 20° Centigrade, in a concentration as high as 10 percent, based upon the weight of the water, all constituents will be completely soluble, or at least substantially so.

In the preferred embodiments the composition will include about three to eight weight percent of a hydroxyalkylamine surfactant containing two to four carbon atoms in the alkyl group. A composition containing about 0.2 to 0.6 weight percent of a poly(oxyethylene)alkyl alcohol reaction product surfactant is especially desirable for certain applications.

Other objects of the invention are attained by the provision of aqueous solutions of the above-defined compositions, diluted so as to provide [0.03 to 0.6 gram] *0.1 to 3.6 grams* per liter of the thiocyanate salt dissolved in the solution.

Additional objects are attained by the provision of physicochemical processes for the refinement of magnetic stainless steel surfaces of objects, utilizing aqueous solutions composed as hereinabove described. The solution is introduced into the container of a mass finishing unit (e.g., an open vibratory bowl) together with a mass of elements, including a quantity of objects with magnetic stainless steel surfaces, and the elements are rapidly agitated while their surfaces are maintained in a wetted condition with the solution. The nature of the apparatus used and the level of agitation are such as to produce relative movement and contact among the elements, and to produce substantial oxygenation of the solution; agitation is continued for a period sufficient to effect a significant reduction in roughness of the surfaces, which period will typically be five hours or less. Most desirably the mass of elements will include a quantity of high-density, nonabrasive media, although abrasive ceramic and plastic media may be employed if so desired, or the process may be carried out in the absence of media (i.e., with part-on-part operation).

Normally, the hydroxyalkylamine constituent of the composition provided or employed will be selected from the group consisting of monoethanolamine, diethanolamine, triethanolamine, isopropanolamine and isobutanolamine. The poly(oxyethylene)/alkyl alcohol surfactant will desirably be one that is selected from the class consisting of: (1) linear primary alcohol ethoxylate compounds containing 9 to 11 carbon atoms in the alcohol group and an average of 6 moles of ethylene oxide per mole of alcohol, and (2) nonylphenoxypoly(ethyleneoxy)ethanol compounds containing 2 to 30 moles of ethylene oxide per mole of alcohol.

DETAILED DESCRIPTION OF THE PREFERRED EMBODIMENTS

Exemplary of the efficacy of the present invention are the following specific examples:

Example One

Three dry powder formulations embodying the invention are prepared by blending the ingredients listed in Table One below, in the amounts indicated; "SCN" is sodium thiocyanate,, "SMNBS" is sodium [m-nitrobenzoic acid] *m-nitrobenzene sulfonate*, and the amounts stated represent weight percentages of the entire formulation:

TABLE One

| | Oxalic Acid | SCN | SMNBS | Total SCN + SMNBS | Ratio SCN:SMNBS |
|---|---|---|---|---|---|
| A | 98 | 0.33 | 1.67 | 2 | 1:5 |
| B | 95 | 1.0 | 4.0 | 5 | 1:4 |
| C | 92 | 2.0 | 6.0 | 8 | 1:3 |

Each of the foregoing formulations is fully dissolved in warm water, in the amount of 45 grams per liter, and is employed as follows:

A flat-bottom vibratory bowl, having a working capacity of 425 liters (15 cubic feet), is set to operate with an amplitude of 3.5 millimeters and a lead angle of 650. The bowl is loaded with approximately two thousand pounds of a commercially available burnishing media, referred to as "Media D" in the above-mentioned Michaud U.S. Pat. No. 4,818,333. The media is believed to be nominally composed of aluminum, silicon, iron and titanium oxides, with grains about 1 to 25 microns in maximum dimension and of mixed platelet and granular shape; the elements are in the form of angle-cut cylinders, measuring about 1.3 cm in diameter and about 2.2 cm in length; they have a density of about 3.3 g/cc and a diamond pyramid hardness value of about 1130 (as determined by ASTM method E-384 using a 1000 gram load, and by averaging three readings). The mass of elements has a bulk density of about 2.3 g/cc, and the media is preconditioned as necessary to remove sharp edges.

Also introduced into the bowl of the unit, as the workpieces to be finished, are 375 golf club heads. The heads are cast from 17-4 PH stainless steel and are polished with a 150 grit belt; all casting pits are thereby removed, and the arithmetic average roughness (Ra) value of the surfaces is approximately 45 microinches (1.143 micrometers), as determined with a "P-5" Hommel tester. Each working solution is delivered to the bowl of the vibratory unit at the rate of about 23 liters per hour on a flow-through basis, and at room temperature, the unit being set to run at 1300 cycles per minute. After a suitable period of operation, the club heads are removed from the bowl, placed on racks, rinsed with water, and dried. Upon evaluation, all of the heads are found to exhibit an Ra surface value of 4 to 5 microinches (0.1016 to 0.1270 micrometer), and to be free from belt lines and from significant pitting, etching, corrosion or other intergranular attack; meter removal is found to be minimal and to have occurred in a highly uniform manner and with all contours and edges of the parts faithfully preserved. These results are produced using the solution of formulation A in about 4.5 hours; they are achieved in about 3.5 hours with the solution of formulation B, and in about 3.0 hours using the solution of formulation C. Cycle times will of course vary, depending upon the roughness of the staring surface; with relatively smooth parts (such as the foregoing) a cycle time of five hours or less may be employed.

Example Two

Four dry powder formulations are prepared by blending the ingredients listed in Table Two below, in the weight percentages indicated:

TABLE Two

| | Oxalic Acid | SCN | SMNBS | Total SCN + SMNBS | Ratio SCN:SMNBS |
|---|---|---|---|---|---|
| D | 99 | 0.17 | 0.83 | 1 | 1:5 |
| E | 88 | 6.0 | 6.0 | 12 | 1:1 |
| F | 88 | 1.1 | 10.9 | 12 | 1:10 |
| G | 76 | 6.0 | 18.0 | 24 | 1:3 |

An 85 liter (three cubic foot) flat bottom vibratory bowl is employed at an amplitude setting of 3.5 mm and a lead angle of 70°, using the same media as in Example One. The workpieces comprise four virtually identical coupons of investment cast 17-4 PH stainless steel, prefinished to an Ra value of 6 microinches (0.1524 micrometer); additional metal parts of the same stainless steel are loaded into the bowl, in an amount sufficient to substantially fill the bowl so as to simulate production conditions.

Each of the formulations D-G is dissolved in water at a concentration of 60 grams per liter, and is introduced into the bowl of the mass finishing unit at a flow rate of about 7 liters per hour; operation is on a flow-through basis. The test runs are continued for four hours, following which the coupons are removed from the bowl, rinsed, dried and weighed; averaged weight losses are determined to be 0.062 gram for formulation D, 0.083 gram for formulation E, 0.084 gram for formulation F and 0.10 gram for formulation G. The surfaces are found to be free from significant pitting, etching, corrosion or other intergranular attack, and metal removal is found to have occurred in a highly uniform manner.

Example Three

Five dry powder formulations are prepared by blending the ingredients listed in Table Three below, in the weight percentages indicated; "TEA" is triethanolamine, "MEA" is monoethanolamine:

TABLE Three

| | Oxalic Acid | SCN | SMNBS | Total SCN + SMNBS | Ratio SCN: SMNBS | TEA | MEA |
|---|---|---|---|---|---|---|---|
| H | 92.2 | 1.25 | 3.75 | 5 | 1:3 | 2.8 | — |
| I | 87.2 | 3.33 | 6.67 | 10 | 1:2 | 2.8 | — |
| J | 89.2 | 0.5 | 2.5 | 3 | 1:5 | 7.8 | — |
| K | 80.2 | 6.0 | 18.0 | 24 | 1:3 | 7.8 | — |
| L | 80.2 | 2.0 | 10.0 | 12 | 1:5 | — | 7.8 |

Each formulation is dissolved in water in the amount of 45 grams per liter, and the resultant solution is tested using the procedure and workpieces hereinabove described in connection with Example One. In all cases excellent surface refinement is achieved, with metal being removed rapidly and with a high degree of uniformity; no significant pitting, etching, corrosion or other intergranular attack is produced. In addition, any tendency for odor generation that has been found to occur otherwise (as would be true especially of formulation K) is suppressed; although odor is present in some instances, in no case is it regarded to be at an objectionable, much less intolerable, level.

Example Four

Four additional dry powder formulations are prepared by blending the ingredients listed in Table Four below, in the weight percentages indicated; "CO-710" is IGEPAL CO-710, a nonylphenoxypoly(ethyleneoxy)ethanol surfactant available from GAF Chemicals Corporation, containing 10–11 ethyleneoxy groups per molecule:

TABLE Four

| | Oxalic Acid | SCN | SMNBS | Total SCN + SMNBS | Ratio SCN: SMNBS | TEA | CO-710 |
|---|---|---|---|---|---|---|---|
| M | 90 | 0.33 | 1.67 | 2 | 1:5 | 7.72 | 0.28 |
| N | 86.5 | 0.5 | 5.0 | [6] 5.5 | 1:10 | 7.72 | 0.28 |
| O | 89.1 | 0.75 | 2.25 | 3 | 1:13 | 7.75 | 0.15 |
| P | 80.1 | 2.0 | 10.0 | 12 | 1:5 | 7.75 | 0.15 |

Each of the foregoing formulations is dissolved in water, in the concentration of 45 grams per liter, and is passed through the 133 liter (four cubic foot) flat bottom bowl of a vibratory mass finishing unit, at the rate of about 11 liters per hour on a flow-through basis. The bowl of the unit contains 400 pairs of scissors made of 410 stainless steel, hardened to a Rockwell value of 56C, with 120-grit belt polished surfaces of 85 microinches Ra value. It also contains an equal-parts mixture of the media employed in Example One hereof and "Media C" of the aforesaid Michaud patent, in an amount sufficient to substantially fill the bowl.

The bowl is operated for six hours at a setting of 4 mm amplitude, with a lead angle of 65° and at a rate of 1300 cycles per minute, using a solution of the selected formulation. Operation is continued thereafter to provide a burnishing cycle of two hours duration, utilizing an alkaline soap solution introduced on a flow-through basis at the rate of about 45 liters per hour.

After removal of the scissors they are rinsed and dried, and are inspected to assess the quality and character of their surfaces, giving particular attention to the confronting surfaces in the hinge area. The external, exposed surfaces of the scissors are found to be line-free and specular bright, with an averaged Ra value of 3.14 microinches (0.080 micrometers); all surfaces, including the oxygen-starved surfaces under the hinge, are free from pitting, etching, corrosion and other intergranular attack, and the hinge mechanism itself is found to be tight and to operate smoothly.

Repeating the foregoing experiments using formulations M-P, but omitting both the TEA and the CO-710, results in the production of parts having exposed surfaces of comparable quality, but with unacceptable pitting and etching in the hinge areas and with significant loosening of the mechanism due to excessive metal dissolution. Additional tests utilizing formulations M-P from which only the TEA is omitted are found to produce parts that are acceptable from the standpoint of pitting, etching and excessive metal removal of and from the overlapped surfaces; however, finishing occurs at exceptionally slow rates, as compared to those that are realized utilizing the unaltered formulations.

The sulfur-containing ingredient to be utilized in the practice of the present invention will preferably be a thiocyanate salt, and most desirably the sodium salt, but thiourea, dithiocarbamate salts, and tetramethylthiuram monosulfide may also be employed; all functional sulfur compounds appear to generate hydrogen sulfide in the presence of the workpiece. The concentrations of the several sulfur-containing compounds, which will be effective without engendering pitting or other problems (such as odor), will vary depending upon the compound employed, and appropriate proportions and concentrations have been indicated hereinabove. It should also be appreciated that the effectiveness of a particular compound will usually depend, to at least some degree, upon the make-up of the entire composition and the metallurgical history of a given workpiece.

Using sodium thiocyanate as the most exemplary sulfur-containing compound, to be effective herein without causing unacceptable pitting or intergranular attack the working solution should contain about [0.03 to 0.6, and preferably about 0.11 to 0.23, gram] *0.1 to 3.6 grams* per liter. As a practical matter, therefore, the dry formulation from which the solution is prepared should not contain more than 12 weight percent of the thiocyanate compound.

Suitable nitrobenzene (aromatic nitro) oxidizers for use in the practice of the invention include m-nitrobenzene sulfonic acid, nitroisophthalic acids, nitroterephthalic acid, nitro-p-toluic acid, nitrobenzoic acids, chloronitrobenzoic acids, alkali metal and ammonium salts of said acids, and 4-chloro-3-nitro-benzenesulfonamide. The preferred compound is the sodium salt of m-nitrobenzene sulfonic acid, but it is believed that the other designated oxidizers may be substituted to good effect in many instances.

As indicated hereinabove, the dry powder formulation may contain from as little as one, to as much as 24, weight percent of the combination of thiocyanate and m-nitrobenzene sulfonate. In the preferred embodiments, however, the combined weights thereof will not exceed 12 percent, and it should be emphasized that when the combination of accelerators is at the upper end of the range satisfactory results will usually be realized only when the weight ratio of the thiocyanate compound to the nitrobenzene compound in the mixture is optimal; i.e., in the range 1:2.5 to 1:4 (i.e., 0.7–1.12:1, on a molar basis). At lower concentrations of the combination, the SCN:SMNBS ratio may be as high as 1:10, consistent with the broad molar ratio range of 0.28–2.8:1 specified herein.

In addition to the problems of pitting and intergranular attack (discussed more fully hereinbelow), it has been found that excessively high concentrations of the sulfur compound can produce objectionable odor, as is particularly problematic in a process such as the present one, which must, as a practical matter, be carried out in equipment that is open or vented to the atmosphere. The addition of 2.5 to 10 percent, and preferably not more than 8 percent, of a hydroxy(lower)alkyl amine formulation has been found to be effective in ameliorating that effect. An exemplary formulation, in which the sodium thiocyanate:sodium m-nitrobenzene sulfonate weight ratio is 1:1.25 to 3:5, will desirably contain 2.8 percent of triethanolamine. Another such formulation may advantageously contain 7.8 percent of the amine, with an SCN:SMNBS ratio in the range 1:2.5 to 4; in the latter instance the combined amounts of SCN and SMNBS should not exceed 12 percent of the total weight of the dry formulation.

Although the acid ingredient may be comprised solely of oxalic acid, in many instances it will be desirable to include therewith as much as an equal amount of other organic and/or inorganic acidic components, particularly the phosphates such as sodium tripolyphosphate, monosodium phosphate, tetrapotassium pyrophosphate, sodium hexametaphosphate and the like, or other similarly effective compounds known to those skilled in the art; fluoride ion, introduced for example as ammonium, sodium or potassium bifloride, may also be beneficial in certain instances. In the preferred embodiments oxalic acid will constitute at least twice the amount of any other acid component utilized, and when a second acid is employed the weight ratio of oxalic acid thereto will most desirably be at least 3.5:1.

The "dry" formulation, (i.e., the formulation exclusive of water) containing the ingredients in the specified proportions, will generally be diluted in an amount of about 15 to 90, preferably 20 to 75, and most desirably 45 to 60 grams per liter with water, so as to give the desired concentrations of active ingredients in solution. The most significant factors, insofar as concerns the attainment of accelerated activity without adverse effects, are the ratio of the sulfur-containing ingredient to the aromatic nitro compound, and the concentration of the combinations thereof. Specific ratios and amounts to afford optimal results will depend upon the particular ingredients employed, as well as the nature of the metal being treated. Optimal proportions and concentrations for the thiocyanate and m-nitrobenzene compounds have however been set forth, and must be adhered to if the best results are to be achieved.

The solutions of the invention are satisfactorily operative in the pH range 1–6.5; outside of that range pitting or other surface attack tends to occur. They also function most satisfactorily at ambient temperatures, although elevated temperatures may be employed (and may occur inherently as a natural consequence of the mechanical action that takes place during treatment). It should be appreciated that temperature can have a very significant effect upon the results produced.

As indicated above, the level of aeration of the workpiece surfaces is highly significant insofar as the action produced by the solution is concerned, and hence in determining optimal concentrations of ingredients. That is, where anaerobic, or oxygen-starved conditions exist at a given site (e.g., in joints, sheltered areas, or areas under a mask, which are nevertheless wetted with the solution), the concentration of the sulfur-containing ingredient in particular must be lower than would otherwise be suitable. Anaerobic pitting will usually be encountered when the dry formulation contains about two to six percent of the combination of SCN and SMNBS, when the weight ratio thereof is in the range 1:1 to 1:5, and when the formulation is employed in a concentration in excess of about 45 grams per liter.

As noted hereinabove with reference to Example Four, however, the incorporation of a poly(oxyethylene)alkyl alcohol surfactant has been found to be effective in substantially reducing or avoiding the pitting, etching, corrosion or other intergranular attack that tends to result in areas of the workpieces that are inadequately oxygenated. Although advantageous from that standpoint, and also from the standpoint of maximizing the ability of the formulation to function under a wide range of vibratory bowl loading conditions, a four-component formulation containing such an ingredient is of only limited utility because of the relatively poor finishing rates that have been found to result from the presence of the poly(oxyethylene) surfactant.

In accordance with the present invention, it has been found that the incorporation of an hydroxy(lower)alkyl amine, of the kind and in the concentrations hereinabove specified, into the four-component formulations containing a poly(oxyethylene)alkyl alcohol surfactant, effects a dramatic reversal of the rate-depressing effect of the latter. Thus, not only can the amine function to suppress a tendency for odor development and to enhance the wetting action of the solution, but it also serves to increase the rate of refinement that is achieved with poly(oxyethylene) surfactant-modified formulations. This is regarded to be a most surprising and beneficial aspect of the instant invention.

When employed, the poly(oxyethylene)alkyl alcohol surfactant is incorporated in an amount of 0.1 to 1.0, and preferably not more than 0.3, percent based upon the total weight of the dry powder formulation. The amount necessary to achieve the desired effect is primarily dependent upon the SCN:SMNBS ratio and the total amount of those ingredient, increasing proportionately therewith.

As an alternative to the IGEPAL CO-710 employed in Example Four, another surfactant that has been found to be effective in this application is NEODOL 91-6, a product commercially available from the Shell Oil Company; it is characterized to be a linear primary alcohol ethoxylate, constituting a mixture of 9–11 carbon atom alcohol ethoxylates containing an average of six moles of ethyleneoxide per mole of alcohol. It is believed that other similar poly(oxythelene) alkyl alcohol surfactants would be comparably effective in the present compositions and method, but the surfactant must of course be soluble in the acidic aqueous solution, and it is believed that the surfactant must also be cationic under acid conditions.

Operation of the vibratory (or other mass finishing) equipment utilized is carried out in a conventional manner, as has been described herein and in considerable detail in the above-identified patents to Michaud et al, Zobbi et al, and Michaud. As will be appreciated, the apparatus (be it a vibratory bowl, a tumbling barrel, etc.) will normally be open or vented to the atmosphere, to most readily permit the necessary oxygenation of the solution; however closed units, designed to achieve the same end, might also be feasible. It should be emphasized that the preferred mole of operation involves the continuous introduction of fresh solution, with used solution being continuously drawn off from the bowl at substantially the same rate (i.e., with "flow-through" operation). Batch and recirculatory flow modes are decidedly less desirable, since they tend to permit buildup of active by-products and (with replenishment of the solution) of the less rapidly depleted ingredients, leading to excessively high concentrations and, in turn, often to unacceptable quality of the treated surfaces. These consequences can usually be accommodated by using shortened cycle times, but only with an attendant reduction in the level of surface refinement produced, and with a concomitant need to introduce the parts in a better surface condition than would otherwise be necessary.

Finally, it should be emphasized that, although the formulations and solutions of the invention can beneficially be used for the surface refinement of carbon steels, and perhaps for austenitic stainless steels and other metals such as copper, they are most importantly and advantageously applied to magnetic stainless steel, normally defined to contain from 0–4 percent of nickel and less than 18 percent of chromium.

Thus, it can be seen that the present invention provides a novel composition, and a novel aqueous solution made from it, which solution is effective for use in the vibratory mass finishing of objects having magnetic stainless steel surfaces, for the refinement thereof. It also provides a novel mass finishing method utilizing such a solution, and normally carried out in an open vibratory unit. Refinement is achieved at high rates of speed, without significant pitting, etching, corrosion or other intergranular attack of the workpiece surfaces, and, under suitable conditions, with a high degree of uniformity of metal removal over the surface being treated. As a particularly important feature, the invention provides such compositions, solutions and processes with and by which surface refinement is effected without significant pitting, etching, corrosion or other intergranular attack of workpiece surfaces present at anaerobic sites, and by and from which no objectionable level of odor is generated.

Having thus described the invention, what is claimed is:

1. A composition for addition to water to provide an aqueous solution that is effective for use in the physicochemical refinement of magnetic stainless steel surfaces, said composition comprising, in a major amount, an acid ingredient consisting at least predominantly of oxalic acid and, in an amount of from 1 to 24 weight percent of said composition, an accelerating ingredient consisting essentially of a thiocyanate salt and a m-nitrobenzene sulfonate salt present in a molar ratio of 0.28 to 2.8:1.0, respectively, said composition being at least substantially completely soluble in water at 20° Centigrade, in amounts of said composition of up to 10 percent by weight of water.

2. A composition for addition to water to provide an aqueous solution that is effective for use in the physicochemical refinement of magnetic stainless steel surfaces, said composition comprising, in a major amount, an acid ingredient consisting at least predominantly of oxalic acid and, in an amount of from 1 to 24 weight percent of said composition, an accelerating ingredient consisting essentially of a thiocyanate salt and a m-nitrobenzenesulfonate salt present in a molar ratio of 0.28 to 2.8:1.0, respectively, said composition also including about 2.5 to 10 weight percent thereof of a hydroxyalkylamine surfactant containing 2 to 4 carbon atoms in the alkyl group, said composition being at least substantially completely soluble in water at 20° Centigrade, in amounts of said composition of up to 10 percent by weight of water.

3. A composition for addition to water to provide an aqueous solution that is effective for use in the physicochemical refinement of magnetic stainless steel surfaces, said composition comprising, in a major amount, an acid ingredient consisting at least predominantly of oxalic acid and, in an amount of from 1 to 24 weight percent of said composition, an accelerating ingredient consisting essentially of a thiocyanate salt and a m-nitrobenzenesulfonate salt present in a molar ratio of 0.28 to 2.8:1.0, respectively, said composition also including about 2.5 to 10 weight percent thereof of a hydroxyalkylamine surfactant containing 2 to 4 carbon atoms in the alkyl group, and about 0.2 to 0.6 weight percent thereof of a poly(oxyethylene)alkyl alcohol surfactant, said composition being at least substantially completely soluble in water at 20° Centigrade, in amounts of said composition of up to 10 percent by weight of water.

4. A composition for addition to water to provide an aqueous solution that is effective for use in the physicochemical refinement of magnetic stainless steel surfaces, said composition comprising: in a major amount, an acid ingredient consisting at least predominantly of oxalic acid; and, in a minor amount, an accelerating ingredient consisting essentially of (a) a sulfur-containing compound selected from the group consisting of thiocyanate salts, dithiocarbamate salts, thiourea, and tetramethylthiuram monosulfide, and (b) a nitro-benzene compound oxidizing agent selected from the class consisting of m-nitrobenzene sulfonic acid, nitroisophthalic acids, nitroterephthalic acid, nitro-p-toluic acid, nitrobenzoic acids, chloronitrobenzoic acids, alkali metal and ammonium salts of said acids, and 4-chloro-3-nitrobenzenesulfonamide, said minor amount being sufficient to accelerate the rate of reaction between said acid ingredient and a magnetic stainless steel surface; said composition also including about 3 to 8 weight percent thereof of a hydroxyalkylamine surfactant containing 2 to 4 carbon atoms in the alkyl group, said composition being at least substantially completely soluble in water at 20° Centigrade in amounts of said composition of up to 10 percent by weight of water.

5. A composition for addition to water to provide an aqueous solution that is effective for use in the physicochemical refinement of magnetic stainless steel surfaces, said composition comprising: in a major amount, an acid ingredient consisting at least predominantly of oxalic acid; and, in a minor amount, an accelerating ingredient consisting essentially of (a) a sulfur-containing compound selected from the group consisting of thiocyanate salts, dithiocarbamate salts, thiourea, and tetramethylthiuram monosulfide, and (b) a nitro-benzene compound oxidizing agent selected from the class consisting of m-nitrobenzene sulfonic acid, nitroisophthalic acids, nitroterephthalic acid, nitro-p-toluic acid, nitrobenzoic acids, chloronitrobenzoic acids, alkali metal and ammonium salts of said acids, and 4-chloro-3-nitrobenzenesulfonamide, said minor amount being sufficient to accelerate the rate of reaction between said acid ingredient and a magnetic stainless steel surface; said composition also including about 2.5 to 10 weight percent thereof of a hydroxyalkylamine surfactant containing 2 to 4 carbon atoms in the alkyl group, and about 0.2 to 0.6 weight percent thereof of a poly-(oxyethylene)alkyl alcohol surfactant, said composition being at least substantially completely soluble in water at 20° Centigrade, in amounts of said composition of up to 10 percent by weight of water.

6. An aqueous solution for use in the refinement of magnetic stainless steel surfaces, including water and a composition comprising, in a major amount, an acid ingredient consisting at least predominantly of oxalic acid and, in an amount of from 1 to 24 weight percent of said composition, an accelerating ingredient consisting essentially of a thiocyanate salt and a m-nitrobenzene sulfonate salt present in a molar ratio of 0.28 to 2.8:1.0, respectively, all constituents of said composition being at least substantially completely soluble in water at 20° Centigrade, the concentration of said composition being such as to provide, dissolved in said solution, [0.03 to 0.6 gram] *0.1 to 3.6 grams* per liter of said thiocyanate salt.

7. An aqueous solution for use in the refinement of magnetic stainless steel surfaces, including water and a composition comprising, in a major amount, an acid ingredient consisting at least predominantly of oxalic acid and, in an amount of from 1 to 24 weight percent of said composition, an accelerating ingredient consisting essentially of a thiocyanate salt and a m-nitrobenzene sulfonate salt present in a molar ratio of 0.28 to 2.8:1.0, respectively, said composition also including about 2.5 to 10 weight percent thereof of a hydroxyalkylamine surfactant containing 2 to 4 carbon atoms in the alkyl group, all constituents of said composition being at least substantially completely soluble in water at 20° Centigrade, the concentration of said composition being such as to provide, dissolved in said solution, [0.03 to 0.6.gram] *0.1 to 3.6 grams* per liter of said thiocyanate salt.

8. An aqueous solution for use in the refinement of magnetic stainless steel surfaces, including water and a composition comprising, in a major amount, an acid ingredient consisting at least predominantly of oxalic acid and, in an amount of from 1 to 24 weight percent of said composition, an accelerating ingredient consisting essentially of a thiocyanate salt and a m-nitrobenzene sulfonate salt present in a molar ratio of 0.28 to 2.8:1.0, respectively, said composition also including about 2.5 to 10 weight percent thereof of a hydroxyalkylamine surfactant containing 2 to 4 carbon atoms in the alkyl group, and about 0.2 to 0.6 weight percent thereof of a poly(oxyethylene)-alkyl alcohol surfactant, all constituents of said composition being at least substantially completely soluble in water at 20° Centigrade, the concentration of said composition being such as to provide, dissolved in said solution, [0.03 to 0.6 gram] *0.1 to 3.6 grams* per liter of said thiocyanate salt.

9. An aqueous solution for use in the refinement of magnetic stainless steel surfaces, including water and a composition comprising: in a major amount, an acid ingredient consisting at least predominantly of oxalic acid; and, in a minor amount, an accelerating ingredient consisting essentially of (a) a sulfur-containing compound selected from the group consisting of thiocyanate salts, dithiocarbamate salts, thiourea, and tetramethylthiuram monosulfide, and (b) a nitro-benzene compound oxidizing agent selected from the class consisting of m-nitrobenzene sulfonic acid, nitroisophthalic acids, nitroterephthalic acid, nitro-p-toluic acid, nitrobenzoic acids, chloronitrobenzoic acids, alkali metal and ammonium salts of said acids, and 4-chloro-3-nitrobenzenesulfonamide, said minor amount being sufficient to accelerate the rate of reaction between said acid ingredient and a magnetic stainless steel surface; said composition also including about 3 to 8 weight percent thereof of a hydroxyalkylamine surfactant containing 2 to 4 carbon atoms in the alkyl group, all constituents of said composition being at least substantially completely soluble in water at 20° Centigrade, the concentration of said composition being such as to provide, dissolved in said solution, [0.03 to 0.6 gram] *0.1 to 3.6 grams* per liter of said thiocyanate salt.

10. An aqueous solution for use in the refinement of magnetic stainless steel surfaces, including water and a composition comprising: in a major amount, an acid ingredient consisting at least predominantly of oxalic acid; and, in a minor amount, an accelerating ingredient consisting essentially of (a) a sulfur-containing compound selected from the group consisting of thiocyanate salts, dithiocarbamate salts, thiourea, and tetramethylthiuram monosulfide, and (b) a nitro-benzene compound oxidizing agent selected from the class consisting of m-nitrobenzene sulfonic acid, nitroisophthalic acids, nitroterephthalic acid, nitro-p-toluic acid, nitrobenzoic acids, chloronitrobenzoic acids, alkali metal and ammonium salts of said acids, and 4-chloro-3-nitrobenzenesulfonamide, said minor amount being sufficient to accelerate the rate of reaction between said acid ingredient and a magnetic stainless steel surface; said composition also including about 2.5 to 10 weight percent thereof of a hydroxyalkylamine surfactant containing 2 to 4 carbon atoms in the alkyl group, and about 0.2 to 0.6 weight percent thereof of a poly(oxyethylene)alkyl alcohol surfactant, all constituents of said composition being at least substantially completely soluble in water at 20° Centigrade, the concentration of said composition being such as to provide, dissolved in said solution, [0.03 to 0.6 gram] *0.1 to 3.6 grams* per liter of said thiocyanate salt.

11. In a physicochemical process for the refinement of magnetic stainless steel surfaces of objects, the steps comprising:

(a) providing an aqueous solution of a composition comprising, in a major amount, an acid ingredient consisting at least predominantly of oxalic acid and, in an amount of from 1 to 24 weight percent of said composition, an accelerating ingredient consisting essentially of a thiocyanate salt and a m-nitrobenzenesulfonate salt present in a molar ratio of 0.28 to 2.8:1.0, respectively, said composition being at least substantially completely soluble in water at 20° Centigrade, in amounts of said composition of up to 10 percent by weight of water, the concentration of said composition being such as to provide, dissolved in said solution, [0.03 to 0.6 gram] *0.1 to 3.6 grams* per liter of said thiocyanate salt;

(b) introducing into the container of a mass finishing unit a mass of elements comprising [of] a quantity of objects with magnetic stainless steel surfaces;

(c) wetting said mass of elements with said solution;

(d) rapidly agitating said mass of elements while maintaining said surfaces in a wetted condition with said solution, said agitation producing relative movement and contact among said elements, and substantial oxygenation of said solution; and (e) continuing said agitation step for a period sufficient to effect a significant reduction in roughness of said surfaces.

12. In a physicochemical process for the refinement of magnetic stainless steel surfaces of objects, the steps comprising:

(a) providing an aqueous solution of a composition comprising, in a major amount, an acid ingredient consisting at least predominantly of oxalic acid and, in an amount of from 1 to 24 weight percent of said composition, an accelerating ingredient consisting essentially of a thiocyanate salt and a m-nitrobenzenesulfonate salt present in a molar ratio of 0.28 to 2.8:1.0, said composition also including about 2.5 to 10 weight percent thereof of a hydroxyalkylamine surfactant containing 2 to 4 carbon atoms in the alkyl group, respectively, all constituents of said composition being at least substantially completely soluble in water at 20° Centigrade, in amounts of said composition of up to 10 percent by weight of water, the concentration of said composition being such as to provide, dissolved in said solution, [0.03 to 0.6 gram] *0.1 to 3.6 grams* per liter of said thiocyanate salt;

(b) introducing into the container of a mass finishing unit a mass of elements comprising [of] a quantity of objects with magnetic stainless steel surfaces;

(c) wetting said mass of elements with said solution;

(d) rapidly agitating said mass of elements while maintaining said surfaces in a wetted condition with said solution, said agitation producing relative movement and contact among said elements, and substantial oxygenation of said solution; and (e) continuing said agitation step for a period sufficient to effect a significant reduction in roughness of said surfaces.

13. In a physicochemical process for the refinement of magnetic stainless steel surfaces of objects, the steps comprising:

(a) providing an aqueous solution of a composition comprising, in a major amount, an acid ingredient consisting at least predominantly of oxalic acid and, in an amount of from 1 to 24 weight percent of said composition, an accelerating ingredient consisting essentially of a thiocyanate salt and a m-nitrobenzenesulfonate salt present in a molar ratio of 0.28 to 2.8:1.0, said composition also including about 2.5 to 10 weight percent thereof of a hydroxyalkylamine surfactant containing 2 to 4 carbon atoms in the alkyl group, and about 0.2 to 0.6 weight percent thereof of a poly(oxyethylene)-alkyl alcohol surfactant, respectively, all constituents of said composition being at least substantially completely soluble [at] in water *at* 20° Centigrade, in amounts of said composition of up to 10 percent by weight of water, the concentration of said composition being such as to provide, dissolved in said solution, [0.03 to 0.6 gram] *0.1 to 3.6 grams* per liter of said thiocyanate salt;

(b) introducing into the container of a mass finishing unit a mass of elements comprising [of] a quantity of objects with magnetic stainless steel surfaces;

(c) wetting said mass of elements with said solution;

(d) rapidly agitating said mass of elements while maintaining said surfaces in a wetted condition with said solution, said agitation producing relative movement and contact among said elements, and substantial oxygenation of said solution; and (e) continuing said agitation step for a period sufficient to effect a significant reduction in roughness of said surfaces.

14. In a physicochemical process for the refinement of magnetic stainless steel surfaces of objects, the steps comprising:

(a) providing an aqueous solution of a composition comprising: in a major amount, an acid ingredient consisting at least predominantly of oxalic acid; and, in a minor amount, an accelerating ingredient consisting essentially of (a) a sulfur-containing compound selected from the group consisting of thiocyanate salts, dithiocarbamate salts, thiourea, and tetramethylthiuram monosulfide, and (b) a nitro-benzene compound oxidizing agent selected from the class consisting of m-nitrobenzene sulfonic acid, nitroisophthalic acids, nitroterephthalic acid nitro-p-toluic acid, nitrobenzoic acids, chloronitrobenzoic acids, alkali metal and ammonium salts of said acids, and 4-chloro-3-nitrobenzenesulfonamide, said minor amount being sufficient to accelerate the rate of reaction between said acid ingredient and a magnetic stainless steel surface; said composition also including about 3 to 8 weight percent thereof of a hydroxyalkylamine surfactant containing 2 to 4 carbon atoms in the alkyl group, all constituents of said composition being at least substantially completely soluble in water at 20° Centigrade, in amounts of said composition of up to 10 percent by weight of water, the concentration of said composition being such as to provide, dissolved in said solution, [0.03 to 0.6 gram] *0.1 to 3.6 grams* per liter of said thiocyanate salt;

(b) introducing into the container of a mass finishing unit a mass of elements comprising [of] a quantity of objects with magnetic stainless steel surfaces;

(c) wetting said mass of elements with said solution;

(d) rapidly agitating said mass of elements while maintaining said surfaces in a wetted condition with said solution, said agitation producing relative movement and contact among said elements, and substantial oxygenation of said solution; and (e) continuing said agitation step for a period sufficient to effect a significant reduction in roughness of said surfaces.

15. In a physicochemical process for the refinement of magnetic stainless steel surfaces of objects, the steps comprising:

(a) providing an aqueous solution of a composition comprising: in a major amount, an acid ingredient consisting at least predominantly of oxalic acid; and, in a minor amount, an accelerating ingredient consisting essentially of (a) a sulfur-containing compound selected from the group consisting of thiocyanate salts, dithiocarbamate salts, thiourea, and tetramethylthiuram monosulfide; and (b) a nitro-benzene compound oxidizing agent selected from the class consisting of m-nitrobenzene sulfonic acid, nitroisophthalic acids, nitroterephthalic acid, nitro-p-toluic acid, nitrobenzoic acids, chloronitrobenzoic acids, alkali metal and ammonium salts of said acids, and 4-chloro-3-nitrobenzenesulfonamide, said minor amount being sufficient to accelerate the rate of reaction between said acid ingredient and a magnetic stainless steel surface; said composition also including about 2.5 to 10 weight percent thereof of a hydroxyalkylamine surfactant containing 2 to 4 carbon atoms in the alkyl group, and about 0.2 to 0.6 weight percent thereof of a poly(oxyethylene)-alkyl alcohol surfactant, all constituents of said composition being at least substantially completely soluble in water at 20° Centigrade, in amounts of said composition of up to 10 percent by weight of water, the concentration of said composition being such as to provide, dissolved in said solution, [0.03 to 0.6 gram] *0.1 to 3.6 grams* per liter of said thiocyanate salt;

(b) introducing into the container of a mass finishing unit a mass of elements comprising [of] a quantity of objects with magnetic stainless steel surfaces;

(c) wetting said mass of elements with said solution;

(d) rapidly agitating said mass of elements while maintaining said surfaces in a wetted condition with said solution, said agitation producing relative movement and contact among said elements, and substantial oxygenation of said solution; and (e) continuing said agitation step for a period sufficient to effect a significant reduction in roughness of said surfaces.

16. The composition of claims 2 or 4 wherein said hydroxyalkylamine surfactant is selected from the group consisting of monoethanolamine, diethanolamine, triethanolamine, isopropanolamine and isobutanolamine.

17. The solution of claims 7 or 9 wherein said hydroxyalkylamine surfactant is selected from the group consisting of monoethanolamine, diethanolamine, triethanolamine, isopropanolamine and isobutanolamine.

18. The process of claims 12 or 14 wherein said hydroxyalkylamine surfactant is selected from the group consisting of monoethanolamine, diethanolamine, triethanolamine, isopropanolamine and isobutanolamine.

19. The composition of claims 3 or 5 wherein said hydroxyalkylamine surfactant is selected from the group consisting of monoethanolamine, diethanolamine, triethanolamine, isopropanolamine and isobutanolamine; and wherein said poly(oxyethylene)alkyl alcohol surfactant is selected from the class consisting of linear primary alcohol ethoxylate compounds containing 9 to 11 carbon atoms in the alcohol group and an average of 6 moles of ethylene oxide per mole of alcohol, and nonylphenoxypoly(ethyleneoxy)ethanol compounds containing 2 to 30 moles of ethylene oxide per mole of alcohol.

20. The solution of claims 8 or 10 wherein said hydroxyalkylamine surfactant is selected from the group consisting of monoethanolamine, diethanolamine, triethanolamine, isopropanolamine and isobutanolamine; and wherein said poly(oxyethylene)alkyl alcohol surfactant is selected from the class consisting of linear primary alcohol ethoxylate compounds containing 9 to 11 carbon atoms in the alcohol group and an average of 6 moles of ethylene oxide per mole of alcohol, and nonylphenoxypoly(ethyleneoxy)ethanol compounds containing 2 to 30 moles of ethylene oxide per mole of alcohol.

21. The process of claims 13 or 15 wherein said hydroxyalkylamine surfactant is selected from the group consisting of monoethanolamine, diethanolamine, triethanolamine, isopropanolamine and isobutanolamine; and wherein said poly(oxyethylene)alkyl alcohol surfactant is selected from the class consisting of linear primary alcohol ethoxylate compounds containing 9 to 11 carbon atoms in the alcohol group and an average of 6 moles of ethylene oxide per mole of alcohol, and nonylphenoxypoly(ethyleneoxy)ethanol compounds containing 2 to 30 moles of ethylene oxide per mole of alcohol.

22. The process of claims 11, 12, 13, 14 or 15 wherein said mass of elements includes a quantity of nonabrasive, high density media.

23. The composition of claims 1, 2 or 3 wherein said molar ratio is 0.7 to 1.12:1.0.

24. The composition of claims 1, 2 or 3 wherein said amount of [acid] *accelerating* ingredient does not exceed 12 weight percent of said composition.

25. The solution of claims 6, 7 or 8 wherein said molar ratio is 0.7 to 1.12:1.0, and wherein said amount of [acid] *accelerating* ingredient does not exceed 12 weight percent of said composition.

26. The process of claims 11, 12 or 13 wherein said molar ratio is 0.7 to 1.12:1.0, and wherein said amount of [acid] *accelerating* ingredient does not exceed 12 weight percent of said composition.

27. The process of claims 11, 12 or 13 wherein said period of step (e) is of five hours or less duration.

28. The process of claims 11, 12 or 13 wherein said unit is a vibratory mass finishing unit, and wherein said container thereof is open or vented to the atmosphere.

* * * * *